United States Patent
Shabbir et al.

(10) Patent No.: US 10,496,560 B2
(45) Date of Patent: Dec. 3, 2019

(54) COMPONENT LOCATION IDENTIFICATION AND CONTROLS

(71) Applicant: Dell Products L.P., Round Rock, TX (US)

(72) Inventors: Hasnain Shabbir, Round Rock, TX (US); Robert R. Leyendecker, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/971,246

(22) Filed: May 4, 2018

(65) Prior Publication Data

US 2019/0340139 A1 Nov. 7, 2019

(51) Int. Cl.
| | |
|---|---|
| *G06F 1/20* | (2006.01) |
| *G05D 23/19* | (2006.01) |
| *G06F 13/16* | (2006.01) |
| *G06F 13/362* | (2006.01) |
| *G06F 9/50* | (2006.01) |
| *G06F 13/40* | (2006.01) |

(52) U.S. Cl.
CPC .......... *G06F 13/1605* (2013.01); *G06F 1/206* (2013.01); *G06F 9/5094* (2013.01); *G06F 13/1668* (2013.01); *G06F 13/362* (2013.01); *G06F 13/4068* (2013.01); *G05D 23/1934* (2013.01)

(58) Field of Classification Search
CPC ............................ G06F 1/206; G05D 23/1934
See application file for complete search history.

(56) References Cited

U.S. PATENT DOCUMENTS

| | | | |
|---|---|---|---|
| 2013/0176680 A1* | 7/2013 | Lovicott | G06F 1/206 361/679.48 |
| 2013/0254563 A1* | 9/2013 | Culbert | G06F 1/20 713/300 |

* cited by examiner

Primary Examiner — Zachary K Huson
(74) Attorney, Agent, or Firm — Jackson Walker L.L.P.

(57) ABSTRACT

An information handling system may include a processor; a plurality of connectors configured to receive a corresponding plurality of information handling resources, wherein each connector is located within a particular physical region of the information handling system and is communicatively coupled to the processor; and a management controller communicatively coupled to the processor and configured to provide out-of-band management of the information handling system. The management controller may be further configured to store a data structure that includes a mapping between respective ones of the physical regions and the connectors located within those physical regions; receive a command relating to a particular physical region; and based on the mapping in the data structure, transmit the command, via the connectors that are located in the particular physical region, to the information handling resources received by those connectors.

17 Claims, 2 Drawing Sheets

US 10,496,560 B2

COMPONENT LOCATION IDENTIFICATION AND CONTROLS

TECHNICAL FIELD

The present disclosure relates in general to information handling systems, and more particularly to systems and methods for locating and identifying components of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction, and damage leading to a shortened component lifespan. Accordingly, heatsinks and/or air movers (e.g., cooling fans and blowers) have often been used in information handling systems to cool information handling systems and their components.

Various challenges may arise in the cooling context (as well as other contexts) based on the difficulty of determining the physical location of devices and components within an information handling system. Typically, an information handling system may only have access to a logical designator (e.g., a slot number or the like), which may not be easily converted into a physical location (e.g., front vs. back, left vs. right, top vs. bottom, etc.). This may be the case, for example, because different models or configurations of information handling systems may have different numbering schemes for their connectors, and they may not always correspond in a straightforward way to physical location.

This disclosure thus provides techniques for determining physical locations of information handling resources within an information handling system, as well as controlling such resources based on their locations. In addition to the cooling applications noted above, this may also provide benefits in various other scenarios in the manufacture and use of information handling systems, an discuss in more detail below.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with component location may be reduced or eliminated.

In accordance with embodiments of the present disclosure, an information handling system may include a processor, a plurality of connectors configured to receive information handling resources, and a management controller communicatively coupled to the processor and configured to provide out-of-band management of the information handling system. Each connector may be located within a particular physical region of the information handling system and be communicatively coupled to the processor. The management controller may be configured to store a data structure that includes a mapping between respective ones of the physical regions and the connectors located within those physical regions; receive a command relating to a particular physical region; and based on the mapping in the data structure, transmit the command, via the connectors that are located in the particular physical region, to the information handling resources received by those connectors.

In accordance with these and other embodiments of the present disclosure, a method may include a management controller of an information handling system storing a data structure that includes a mapping between physical regions of the information handling system and connectors of the information handling system that are located within those physical regions, receiving a command relating to a particular physical region, and based on the mapping in the data structure, transmitting the command, via the connectors that are located in the particular physical region, to information handling resources received by those connectors.

In these and other embodiments of the present disclosure, an article of manufacture may include a non-transitory, computer-readable medium having instructions thereon that are executable by a processor of a management controller of an information handling system. The instructions may be executable for storing a data structure that includes a mapping between physical regions of the information handling system and connectors of the information handling system that are located within those physical regions, receiving a command relating to a particular physical region, and based on the mapping in the data structure, transmitting the command, via the connectors that are located in the particular physical region, to information handling resources received by those connectors.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
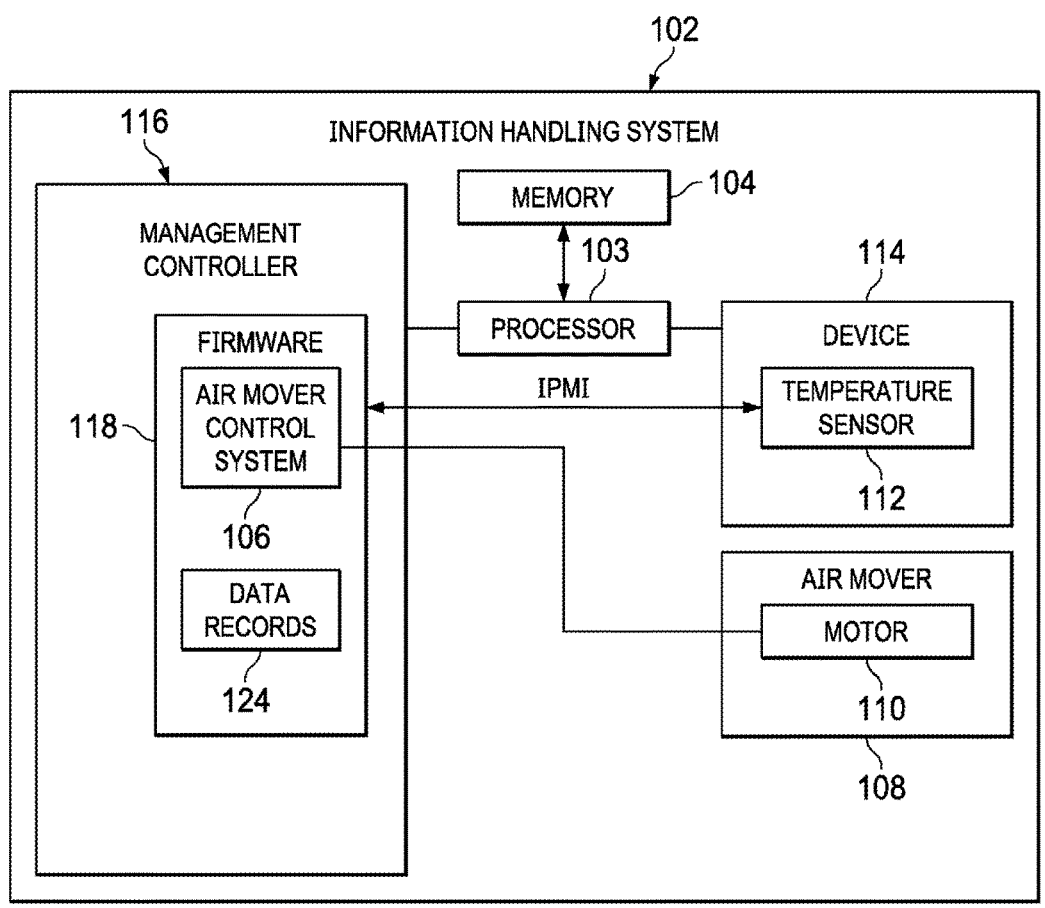
FIG. 1 illustrates a block diagram of an example information handling system, in accordance with the present disclosure.
Figure 2:
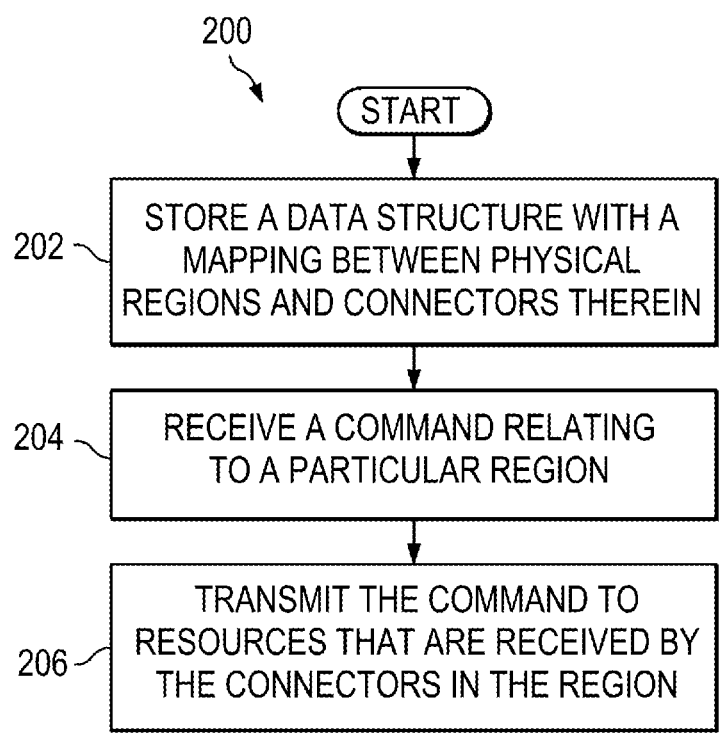
FIG. 2 illustrates a flow chart of an example method, in accordance with embodiments of the present disclosure.

Preferred embodiments and their advantages are best understood by reference to FIGS. 1 through 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected indirectly or directly, with or without intervening elements.

When two or more elements are referred to as "coupleable" to one another, such term indicates that they are capable of being coupled together.

For the purposes of this disclosure, computer-readable media (e.g., transitory or non-transitory computer-readable media) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "connector" may include any physical component of an information handling system (typically but not necessarily located on a motherboard or other circuit board of such system) that is configured to receive an information handling resource. The term "receiving" an information handling resource is to be understood to include receiving a cable or the like which is configured to couple the connector to the information handling resource, even if the information handling resource itself is not directly received in the connector. Examples of connectors include expansion slots such as Peripheral Component Interconnect (PCI) slots and Peripheral Component Interconnect Express (PCIe) slots or risers. Other examples include connectors configured to couple to physical storage resources (e.g., hard disk drives, solid state drives, etc.), such as SATA connectors, mSATA connectors, M.2 connectors, U.2 connectors, etc. Yet other examples include USB connectors, fan headers, PSU connectors, etc.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources" herein). As shown in FIG. 1, information handling system 102 may comprise a processor 103, a memory 104, one or more air movers 108, one or more devices 114, and a management controller 116.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Memory 104 may have stored thereon an operating system. Such an operating system may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by the operating system. In addition, the operating system may include all or a portion of a network stack for network communication via a network interface (e.g., one of devices 114 may be a network interface for communication over a data network). Although the operating system may be stored in memory 104, in some embodiments it may be stored in storage media accessible to processor 103, and active portions of the operating system may be transferred from such storage media to memory 104 for execution by processor 103.

Air mover 108 may be communicatively coupled to air mover control system 106 of management controller 116, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expelling warm air from inside the enclosure to the outside of such enclosure, and/or moving air across one or more heatsinks (not explicitly shown) internal to the enclosure to cool one or more information handling resources.

Device 114 may be communicatively coupled to processor 103 and may generally include any information handling resource. In some embodiments, device 114 may include a temperature sensor 112. Temperature sensor 112 may be any system, device, or apparatus (e.g., a thermometer, thermistor, etc.) configured to generate an electrical signal indicative of a sensed temperature within or proximate to device 114. Signals may be received from temperature sensors 112 (e.g., via an Intelligent Platform Management Interface (IPMI) connection) at management controller 116 and may be used to implement various types of cooling strategies by air mover control system 106. Some examples of such cooling strategies are disclosed in U.S. Patent Publication No. 2017/0329651, which is incorporated by reference herein in its entirety.

Management controller 116 may be configured to provide out-of-band management facilities for management of information handling system 102. Such management may be made by management controller 116 even if information handling system 102 is powered off or powered to a standby state. Management controller 116 may include a processor, memory, an out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118. Firmware 118 may include a program of executable instructions configured to be read and executed by management controller 116 in order to carry out the functionality of management controller 116, including that functionality described herein. For example, firmware 118 may embody an air mover control system 106. Firmware 118 may also include data (e.g., data that need not be executable) such as data records 124. In other embodiments, air mover control system 106 and/or data records 124 may reside on storage media of management controller 116 other than firmware 118 (not shown explicitly).

Air mover control system 106 may include any system, device, or apparatus configured to receive one or more signals indicative of one or more temperatures within information handling system 102 (e.g., one or more signals from one or more temperature sensors 112), receive information regarding thermal parameters of information handling resources (e.g., information from power and/or thermal tables of management controller 116 and/or data records 124) and based on such signals and thermal parameters, calculate an air mover driving signal to maintain an appropriate level of cooling, increase cooling, or decrease cooling, as appropriate, and communicate such air mover driving signal to air mover 108. In various embodiments, air mover control system 106 may operate air movers 108 in an open-loop or a closed-loop fashion.

Firmware 118 may also include information relating the various physical regions of information handling system 102 to the information handling resources located therein. A data structure such as a map, list, array, table, or other suitable data structure may include one or more data records 124, each such data record 124 setting forth information regarding the location of an information handling resource of information handling system 102. A data record may be any suitable data type that includes such information (e.g., a mapping from a particular connector to its region, a mapping from a particular region to the connectors located therein, etc.).

One example of a table data structure including rows corresponding to example data records 124 is shown below at Table 1.

TABLE 1

| Device Type | Slot | Physical Sensor Designator | Sensor Variable Name |
|---|---|---|---|
| HDD | 1 | Front | HDD_Front_1 |
| HDD | 2 | | HDD_Front_2 |
| HDD | 3 | | HDD_Front_3 |
| HDD | 4 | | HDD_Front_4 |
| HDD | 5 | | HDD_Front_5 |
| HDD | 6 | | HDD_Front_6 |
| HDD | 7 | | HDD_Front_7 |
| HDD | 8 | | HDD_Front_8 |
| HDD | 9 | | HDD_Front_9 |
| HDD | 10 | | HDD_Front_10 |
| HDD | 11 | | HDD_Front_11 |
| HDD | 12 | | HDD_Front_12 |
| HDD | 13 | Rear | HDD_Rear_1 |
| HDD | 14 | | HDD_Rear_2 |
| HDD | 15 | Mid | HDD_Mid_1 |
| HDD | 16 | | HDD_Mid_2 |
| HDD | 17 | | HDD_Mid_3 |
| HDD | 18 | | HDD_Mid_4 |

As shown, Table 1 provides a mapping from slot numbers to the physical region or zone (Front, Rear, and Mid in this example) in which those slots are located. Table 1 may be used in cooling calculations, via the use of temperature sensors associated with the HDD devices populating the various slots. Table 1 also provides sensor variable names (also referred to as logical designators) for the various information handling resources, such as the storage resources themselves and/or temperature sensors associated therewith.

Table 2 provides an additional example, in which the information handling resources described in the data structure are fans instead of storage resources. Thus in Table 1 and Table 2, each table includes only one type of information handling resource. In other embodiments, a single table may include multiple types of information handling resource.

TABLE 2

| Device Type | Slot | Physical Sensor Designator | Sensor Variable Name |
|---|---|---|---|
| Fan | 1 | Right | Fan_Right_1 |
| Fan | 2 |  | Fan_Right_2 |
| Fan | 3 | Mid | Fan_Mid_1 |
| Fan | 4 |  | Fan_Mid_2 |
| Fan | 5 | Left | Fan_Left_1 |
| Fan | 6 |  | Fan_Left_2 |

As yet another example, Table 3 provides an example data structure with further information.

TABLE 3

| Device Type | Slot | Physical Sensor Designator | Additional Zoning | Sensor Variable Name | Fan Zone |
|---|---|---|---|---|---|
| PCI | 1 | Right | Top | PCI_R_T | Fan_Right |
| PCI | 2 | Right | Mid | PCI_R_M | Fan_Right |
| PCI | 3 | Right | Bottom | PCI_R_B | Fan_Right |
| PCI | 4 | Mid | Top | PCI_M_T | Fan_Mid |
| PCI | 5 | Mid | Bottom | PCI_M_B | Fan_Mid |
| PCI | 6 | Left | Top | PCI_L_T | Fan_Left |
| PCI | 7 | Left | Bottom | PCI_L_B | Fan_Left |

As shown, the PCI slots described by the data structure of Table 3 correspond to multiple types of region designator (e.g., Right/Mid/Left as well as Top/Mid/Bottom). Further, Table 3 provides information regarding the fan zone that corresponds to each PCI slot. In some embodiments, data records 124 may be updated from time to time, based on whether or not the various connectors have information handling resources received therein. For example, a given data record 124 may have a field indicative of whether or not its corresponding connector is populated with an information handling resource. Such field may be automatically updated when the connector is populated or depopulated As noted, the information in data records 124 may be stored in a data structure that is incorporated into a firmware 118 of management controller 116. In other embodiments, the data structure may also be stored elsewhere. In these and other embodiments, the data structure may be organized internally as a plurality of separate data structures.

In addition to processor 103, memory 104, air mover control system 106, air mover 108, temperature sensor 112, device 114, and management controller 116, information handling system 102 may include one or more other information handling resources.

FIG. 2 illustrates a flow chart of an example method 200 for identifying and controlling information handling resources based on their locations, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as hardware, firmware, software, applications, functions, libraries, or other instructions.

At step 202, a data structure is stored that indicates a mapping between physical regions of an information handling system and connectors that are located within those physical regions. In some embodiments, such a data structure may in the first instance be human-generated. In other embodiments, automated processes may be used to generate the data structure (e.g., based on manufacturing data of the information handling system). The data structure may be stored in a memory that is accessible to a management controller of the information handling system, such as a firmware of the management controller.

In some embodiments, the data structure may include mappings for various different models, versions, or configurations of information handling systems. For ease of distribution, one master data structure may be created that is applicable to several (or even all possible) different information handling systems that are from a particular manufacturer or distributor or the like. Such a master data structure may then be incorporated into a firmware image or the like, which may then be distributed with a plurality of different models, versions, or configurations of information handling systems. A particular information handling system may then (e.g., based on its model number or other configuration data) determine which portion of the data structure is applicable and use only that portion. It is to be understood that in such embodiments, such a master data structure may in fact include a plurality of individual data structures that may be used in this way, and they need not necessarily be combined into a single table or the like.

At step 204, the management controller may receive a command relating to a particular region. Such command may come from a system or component that has no information regarding the data structure or the region mapping it describes, and thus may not be capable of directly addressing the command to the desired information handling resources. Instead, the system or component that sends the command to the management controller may simply specify the region, relying on the management controller to determine which information handling resources are within that region.

As one example, such a command may indicate a target temperature for the particular region (e.g., by changing fan speeds for the fans associated with that region). As another example, such a command may relate to noise abatement or vibration control within that region (e.g., reducing fan speed in a region that contains a particularly vibration-sensitive information handling resource). As another example, such a command may relate to cooling resources and other resources within a region (e.g., setting fan speeds and performance throttling levels within the region).

At step 206, the management controller may transmit the command to those information handling resources that are located within the region (e.g., those information handling resources that are coupled to connectors that are located within the region). The management controller may do so by using the data structure to determine which information handling resources are implicated by the command. In some embodiments, the management controller may forward the command un-altered to such information handling resources; in other embodiments, the management controller may generate a new command for such information handling resources based on the original command. After step 206, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using management controller 116, device 114, components thereof, and/or any other system operable to implement method 200. In certain embodiments, method 200 may be implemented partially or fully in software and/or firmware embodied in computer-readable media.

It is to be noted that while this disclosure describes several embodiments relating to cooling and the like, it may be equally applicable in other circumstances. For example, an end user may find it useful to be able to easily determine which logical designator refers to an information handling resource in a particular location (e.g., for purposes of replacing a failed component). During manufacturing, easy access to location information may assist in diagnostics, inventory processes, etc.

Accordingly, in some embodiments, information regarding components and their physical locations may be accessible to a user of an information handling system via a user interface such as a graphical user interface (GUI). For example, such information may be provided via an in-band user interface of the information handling system itself, or via an out-of-band user interface of a management controller of the information handling system (e.g., through the use of a management console or the like). For example, a user may be able to select a physical region via such a user interface and receive details (such as component type, logical designator, temperature data, etc.) regarding the components that are located therein.

In these and other embodiments, one of ordinary skill in the art with the benefit of this disclosure will understand that information relating to such a user interface may be conveyed using any of various technologies, such as IPMI commands, HTTPS, Remote Access Controller Admin (RACADM), etc. Further, in some embodiments, the user interface may provide the capability for updating data records 124. For example, a table of data records 124 may in some instances be dynamically loaded by an administrator without the need for a whole new version of firmware 118 of management controller 116. This may be a useful feature, for example, when a field modification removes a backplane, installs a new card, etc.

One of ordinary skill in the art with the benefit of this disclosure will understand various other scenarios in which its teachings may be applied.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a plurality of connectors configured to receive a corresponding plurality of information handling resources, wherein each connector is located within a particular physical region of the information handling system and is communicatively coupled to the processor; and
   a management controller communicatively coupled to the processor and configured to provide out-of-band management of the information handling system, and further configured to:
      store a data structure that includes a mapping between respective ones of the physical regions and the connectors located within those physical regions, wherein the physical regions include at least one of a left region, a right region, a front region, and a rear region, and wherein the data structure includes mappings for a plurality of different physical information handling system models, and wherein at least one of the plurality of different physical information handling system models does not correspond to the information handling system;
      receive a command relating to a particular physical region; and
      based on the mapping in the data structure, transmit the command, via the connectors that are located in the particular physical region, to the information handling resources received by those connectors.

2. The information handling system of claim 1, wherein at least one of the information handling resources is a storage resource.

3. The information handling system of claim 1, wherein the data structure is embodied in a firmware of the management controller.

4. The information handling system of claim 1, wherein the plurality of connectors includes at least one physical storage resource connector.

5. The information handling system of claim 1, wherein the management controller is configured to update the data structure in response to information handling resources being coupled to the connectors.

6. The information handling system of claim 1, wherein the data structure includes logical designators for the plurality of connectors.

7. A method comprising:
   a management controller of an information handling system storing a data structure that includes a mapping between physical regions of the information handling system and connectors of the information handling system that are located within those physical regions, wherein the physical regions include at least one of a left region, a right region, a front region, and a rear region, and wherein the data structure includes mappings for a plurality of different physical information handling system models, and wherein at least one of the plurality of different physical information handling system models does not correspond to the information handling system;

the management controller receiving a command relating to a particular physical region; and based on the mapping in the data structure, the management controller transmitting the command, via the connectors that are located in the particular physical region, to information handling resources received by those connectors.

8. The method of claim 7, further comprising providing a user interface that includes information from the data structure regarding the mapping between the physical regions of the information handling system and the connectors of the information handling system that are located within those physical regions.

9. The method of claim 7, wherein the data structure is embodied in a firmware of the management controller.

10. The method of claim 7, wherein the command relates to cooling of the information handling system.

11. The method of claim 7, further comprising updating the data structure in response to information handling resources being coupled to the connectors.

12. An article of manufacture comprising a non-transitory, computer-readable medium having instructions thereon that are executable by a processor of a management controller of an information handling system for:

storing a data structure that includes a mapping between physical regions of the information handling system and connectors of the information handling system that are located within those physical regions, wherein the physical regions include at least one of a left region, a right region, a front region, and a rear region, and wherein the data structure includes mappings for a plurality of different physical information handling system models, and wherein at least one of the plurality of different physical information handling system models does not correspond to the information handling system;

receiving a command relating to a particular physical region; and based on the mapping in the data structure, transmitting the command, via the connectors that are located in the particular physical region, to information handling resources received by those connectors.

13. The article of claim 12, wherein at least one of the information handling resources is a storage resource.

14. The article of claim 12, wherein the article is a firmware of the management controller.

15. The article of claim 12, wherein the command relates to cooling of the information handling system.

16. The article of claim 12, wherein the management controller is configured to update the data structure in response to information handling resources being coupled to the connectors.

17. The article of claim 12, wherein the data structure includes logical designators for the connectors.

* * * * *